(12) United States Patent
Hutchin

(10) Patent No.: US 9,170,162 B2
(45) Date of Patent: Oct. 27, 2015

(54) LASER BEAM CONTROL SYSTEM WITH BIDIRECTIONAL BEAM DIRECTOR

(75) Inventor: Richard A. Hutchin, Calabasas, CA (US)

(73) Assignee: OPTICAL PHYSICS COMPANY

( * ) Notice: Subject to any disclaimer, the term of this patent is extended or adjusted under 35 U.S.C. 154(b) by 542 days.

(21) Appl. No.: 13/561,480

(22) Filed: Jul. 30, 2012

(65) Prior Publication Data

US 2015/0069216 A1    Mar. 12, 2015

(51) Int. Cl.
*H01S 3/08* (2006.01)
*G01J 9/02* (2006.01)
*G01J 1/42* (2006.01)
*G01J 9/00* (2006.01)

(52) U.S. Cl.
CPC .............. *G01J 9/02* (2013.01); *G01J 1/4257* (2013.01); *G01J 9/00* (2013.01)

(58) Field of Classification Search
USPC ................. 250/203.1, 201.9; 372/98–103
See application file for complete search history.

(56) References Cited

U.S. PATENT DOCUMENTS

| 6,393,035 B1 * | 5/2002 | Weingarten et al. ............ 372/18 |
| 6,792,028 B2 * | 9/2004 | Cook et al. ..................... 372/102 |
| 6,992,441 B2 * | 1/2006 | Glosser et al. ................. 313/542 |

OTHER PUBLICATIONS

Ayers, et al., "Holographic Optical Beam-Steering (HOBS)", *Worcester Polytechnic Institute*, (2010), p. 1-186.

* cited by examiner

*Primary Examiner* — Tony Ko
(74) *Attorney, Agent, or Firm* — The Belles Group, P.C.

(57) ABSTRACT

A bidirectional beam director includes a pair of optically coupled diffraction gratings, each being independently rotatable so that a laser beam passing through the pair of gratings can be steered by rotation of at least one of the gratings. The bidirectional beam can be coupled to many types of optical systems, including optical phased arrays, multi-beam laser transmitters and receivers, telescopes, and high energy laser beam control systems.

37 Claims, 12 Drawing Sheets

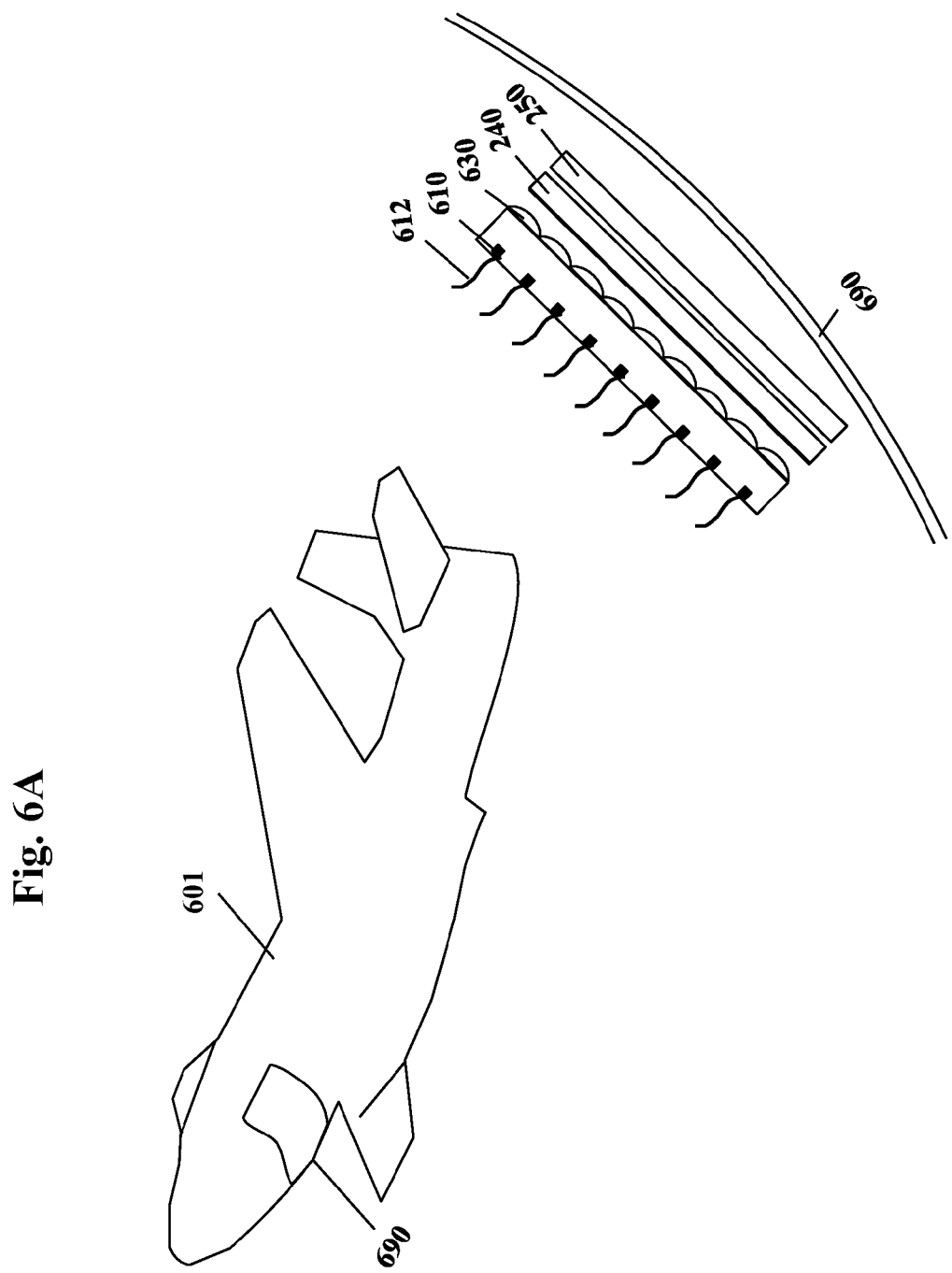

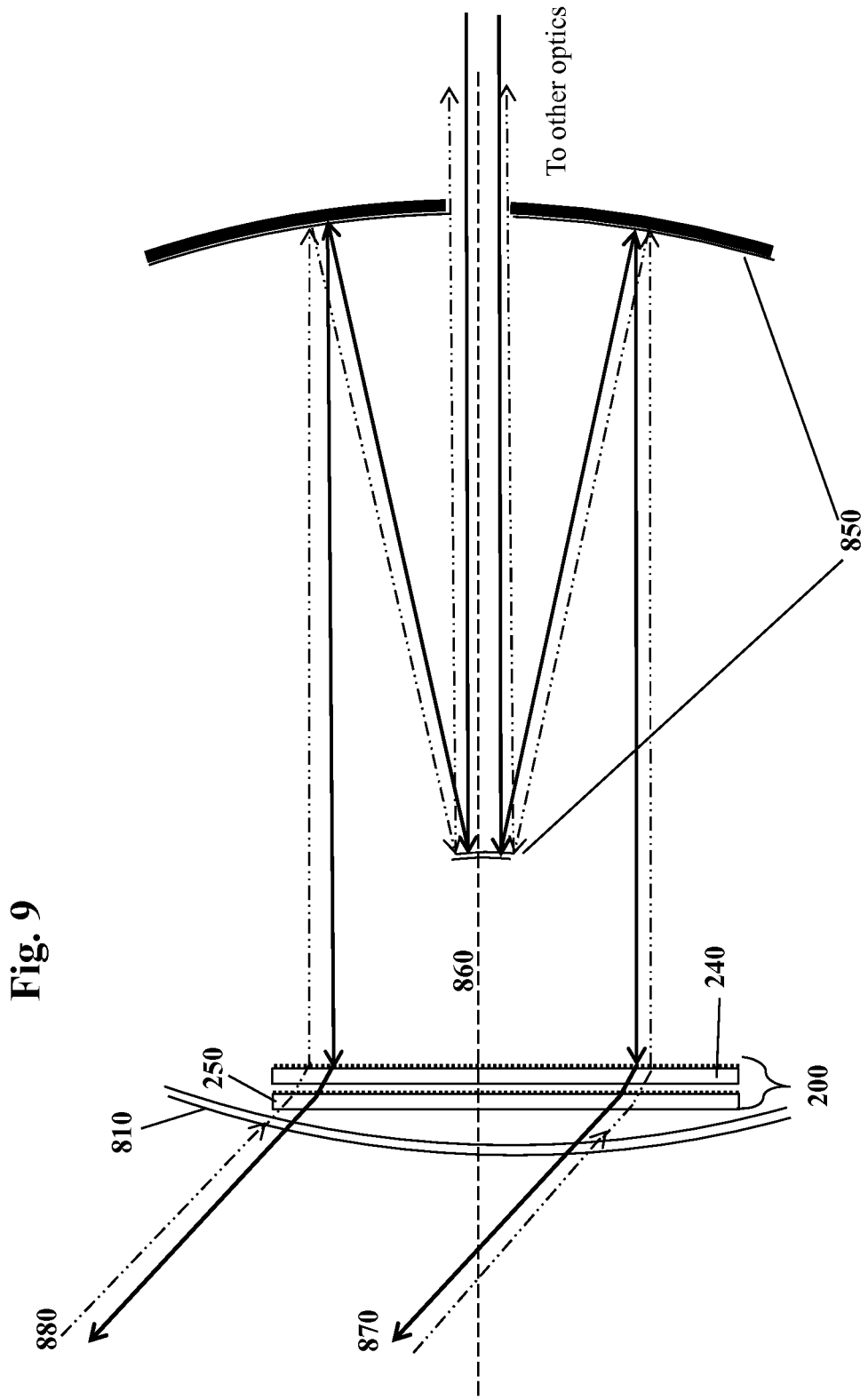

LASER BEAM CONTROL SYSTEM WITH BIDIRECTIONAL BEAM DIRECTOR

BACKGROUND OF THE INVENTION

1. Field of the Invention

The field of the present invention relates to laser beam control systems which include a bidirectional beam director to steer incoming and outgoing laser light in the desired direction.

2. Background

Many systems that use lasers to engage or image a remote target also require mechanisms for steering and directing the laser light over a wide operational field of view. In a typical such system, it is desirable to project a high power beam, typically 30-50 cm in diameter or more, over a wide field of view such as a 90-120 degree cone. Some systems may further require the ability to track the outgoing laser light using backscatter or laser light return from the transmitting medium or the target. Receiving the backscatter or laser light return in turn may require that the incoming laser light be steered onto detectors. This ability to precisely steer and point incoming or outgoing laser light is crucial to the operation of many laser weapons, laser illuminators, and laser imaging systems.

Currently many high energy laser (HEL) systems use turrets as beam directors. A turret is usually large, heavy and disruptive to the aerodynamic properties of the platform it is mounted on. Turrets typically require a volume approximately three times the beam diameter on each side. In addition, a turret is usually mounted exterior to the carrying platform (e.g., an aircraft), and, due to its wide volume of swing, it can substantially impair aerodynamic performance which effectively eliminates the option of supersonic HEL operation. One example is the Airborne Laser (ABL) laser turret mounted on the nose of a Boeing 747-400F aircraft. This turret is a large structure with a complex design. It measures 1.5 meters in diameter and weighs 12 to 15 thousand pounds.

Some HEL laser systems use a monolithic single source laser beam while others use a composite beam which is a combination of multiple beams. Using a composite beam offers some advantages: First, it may be advantageous (in terms of power, weight, size and/or cost) to create the laser power in multiple pathways. Second, it may be more practical to correct the phase and tilt of independent beams than correcting a single large beam with a deformable mirror, especially when laser power is projected through an aberrating medium. Third, when installing a high power laser system on an air vehicle, using multiple beams can allow for a conformal installation which does not disrupt the aerodynamic capabilities of the aircraft.

With multiple beams, the conventional beam steering approach is to create a beam director for each beam. Two examples can be given: The first example is the beam director using electrical switching of polarization combined with birefringent gratings, as disclosed in U.S. Pat. No. 6,765,644 to Anderson et al. Current designs of this beam director have about 40 optical components dedicated to each of the beam director modules. Moreover, the components are high cost due to the requirement for excellent wavefront quality and high transmission. The second example is the beam pointing module disclosed in U.S. Pat. No. 7,898,712 to Adams et al., which uses two rotatable Risley prisms. This Risley design includes inside out torque motors and a substantial number of precision components tightly packed together, leading to high cost per steering module.

In addition to high cost, using individual beam directors for each beam of an optical phased array or multi-beam laser system can create three performance problems. First, the mounts and mechanisms around each beam steering module are larger than the exit beam diameter resulting in substantial gaps between the beams. Gaps between the beams act like diffraction gratings and decrease the amount of power in the phased hit spot proportional to the area fill factor. Since the area fill factor of these two devices varies from 25-64% depending on design parameters, a substantial loss of laser capability can result.

The second problem is the slew induced phase ramp which occurs when engaging a rapidly moving vehicle. A Mach 1 target at 3 km range can be slewing across the field of view at 6 degrees per second. This angular slew rate changes the optical path to each of the fixed beam paths equal to the dot product of the vector rate times their vector separation. Thus for a 50 cm diameter laser array, one side will have its optical path to the target changing at 5 cm/sec relative to the other side. In an optical phased array transmitter, this slew in optical path length must be compensated with an opposite slew in the phase of individual beams in order to keep the beams correctly phased on the target. At 1.03 microns wavelength, 5 cm/sec corresponds to a phasing slew rate of 48,500 cycles per second—all of which must be applied to better than 0.1 waves accuracy at each instant across the full array. This poses a significant technical challenge.

The third problem occurs in a high energy laser system where the input beams are each typically diffracting out of a fiber input. Approximately the central 90% of the beam power is typically directed out each local beam director, and the remaining 10% tends to get caught inside the local beam director, causing heating and scatter which degrade operation.

These multi-beam laser system beam directing and steering challenges can be overcome by using a single bidirectional beam director for all beams.

A multi-beam laser beam control architecture that can be configured to use a single bidirectional beam director is disclosed in U.S. patent publication No. 2011-0176565, based on an application filed Jan. 18, 2010, the disclosure of which is incorporated herein by reference in its entirety.

A multi-beam laser beam control and imaging architecture that can be configured to use a single bidirectional beam director is disclosed in U.S. patent application Ser. No. 13/476,380, filed May 21, 2012, the disclosure of which is incorporated herein by reference in its entirety.

Finally, a laser beam control system for a single monolithic laser beam that can be configured to use a bidirectional beam director is disclosed in U.S. patent publication No. 2011/0103410, based on an application filed Mar. 27, 2009, the disclosure of which is incorporated herein by reference in its entirety. In this particular case, a bidirectional beam director can be used to aim the outgoing laser beam at a distant target and at the same time aim the laser light return (caused by the outgoing beam or the target illuminator beam) towards the wavefront sensors of the beam control architecture.

SUMMARY OF THE INVENTION

The present invention is a laser beam control system with a bidirectional beam director. The laser beam control system can be used to aim a single beam or multiple beams that are entering or exiting its aperture in a desired direction or at an external or remote target.

The laser beam control system with the bidirectional beam director may have any one of the following three configurations:

1) A laser beam control system controlling a single monolithic beam. In this case the laser beam control system includes an output aperture configured both to transmit the single monolithic beam directed toward a target and to receive a laser beam return, the laser beam return including scatter from the outgoing laser beam. The laser beam control system may further include a deformable mirror adapted to control the outgoing laser beam, a sensor adapted to detect a wavefront of the laser beam return, and an optics controller operationally coupled to the deformable mirror and adapted to adjust the deformable mirror in response to the wavefront.
2) A multi-beam laser control system controlling multiple laser beams. In this case the multi beam laser control system includes a laser transmitter configured to emit the multiple laser beams, a sensor with multiple sub-sensors (or detectors) each coupled to a receiving aperture configured to receive light from the multiple beams scattered off a target. The multi-beam laser control system may further include a processor communicably coupled to the sensor and configured to compute a relative phase value for at least one of the beams based on output from the sensor, and a controller communicably coupled to the processor and to the laser transmitter is configured to adjust a phase of at least one of the multiple laser beams.
3) A multi-beam laser control system with imaging. In this case the multi beam laser control system with imaging includes a laser transmitter configured to emit the multiple laser beams towards a target wherein at least one of the beams illuminates the whole target or a substantial portion of the target and at least two of the remaining beams form a high intensity hitspot on the target and a sensor configured to receive light from the beams. The multi-beam laser control system with imaging may further include a processor communicably coupled to the sensor and configured to compute a relative phase of a wavefront of at least one beam based on output from the sensor; and a controller communicably coupled to the processor and to the laser transmitter is configured to adjust a phase of at least one of the beams.

The bidirectional beam director coupled to the laser beam control system consists of a pair of optically coupled diffraction gratings and a mechanism for rotating each grating independently. The rotation of one or more gratings alters the transmit direction of light passing through both gratings. The gratings may be positioned substantially parallel to each other to achieve a compact arrangement. Moreover, the gratings may overlap the full aperture of the laser beam control or alternatively overlap regions of the aperture. Each of the two gratings rotates creating a hollow cone of ray deviation, and two or more hollow cones offer full coverage of the entire filled cone. If only two gratings are used, they are typically set for equal deviation so that the combined deflection can be close to zero. This zero sum allows the center of the filled cone to be accessed. More gratings can be added to increase the field of regard or to avoid a singularity at the center of the field of regard.

Since the gratings are flat and very nearly the same size as the laser beam passing through them, they can transmit out a window only modestly larger than the laser beam itself, even over a 120 degree cone of regard. Such a window can be made of a durable material, such as spinel, which can be manufactured to good optical quality and the appropriate diameter. This window can also be curved to match the contour of the aircraft to minimize aerodynamic drag and turbulence.

The bidirectional beam director significantly simplifies the design of beam directors in multi-beam systems presenting a compact conformal bidirectional implementation with only two or three optical elements. The bidirectional beam director coupled to the multi-beam laser control system or the multi-beam laser control system with imaging has far fewer components than one would have with competing approaches. For example, for a 100 beam multi-laser source arranged in a 10×10 beam array, the Lockheed Risley module requires 200 optical components and thousands of mechanical parts. Similarly for the same arrangement, the Raytheon electronic grating approach requires about 4,000 optical components.

Another advantage of using the disclosed bidirectional beam director in a multi-beam laser control system is that it eliminates the slew-induced phase ramp discussed earlier. Moreover, the fill factor can approach 100%, resulting in simpler, higher performance control systems and increased flux on target. Also with this approach, the internal heating and scatter from the unused sides of the beams can also be almost eliminated using a single grating pair since the beams outside the local aperture will exit the system in some other direction and not be scattered or trapped. The waste heat can be a substantial limiter in how long the laser system can remain powered on before cooling is required, and the HEL scatter can degrade internal sensors.

Accordingly, a laser beam control system with a bidirectional beam director is disclosed. Additional advantages of the improvements will appear from the drawings and the description of the preferred embodiment.

BRIEF DESCRIPTION OF THE DRAWINGS

In the drawings, wherein like reference numerals refer to similar components:

FIG. 6A illustrates the cross section of the bidirectional beam director in FIG. 5 and mounting of the bidirectional beam director onto an aircraft;

FIG. 9 illustrates the bidirectional beam director coupled to a telescope; and

DETAILED DESCRIPTION OF THE PREFERRED EMBODIMENTS

Diffraction gratings are used to steer light. For example, U.S. Pat. No. 6,792,028 discloses a laser beam directing system, which includes diffraction gratings positioned within rotary elements that allow for their rotation. The rotational position of diffraction gratings affects the direction and beam steering angle. The direction and the steering angle are also dependent on the particular wavelength of the beam. Thus, narrowband beams of substantially the same wavelength will be steered at substantially the same angle as they pass through a transmissive diffraction grating.

Figure 1:
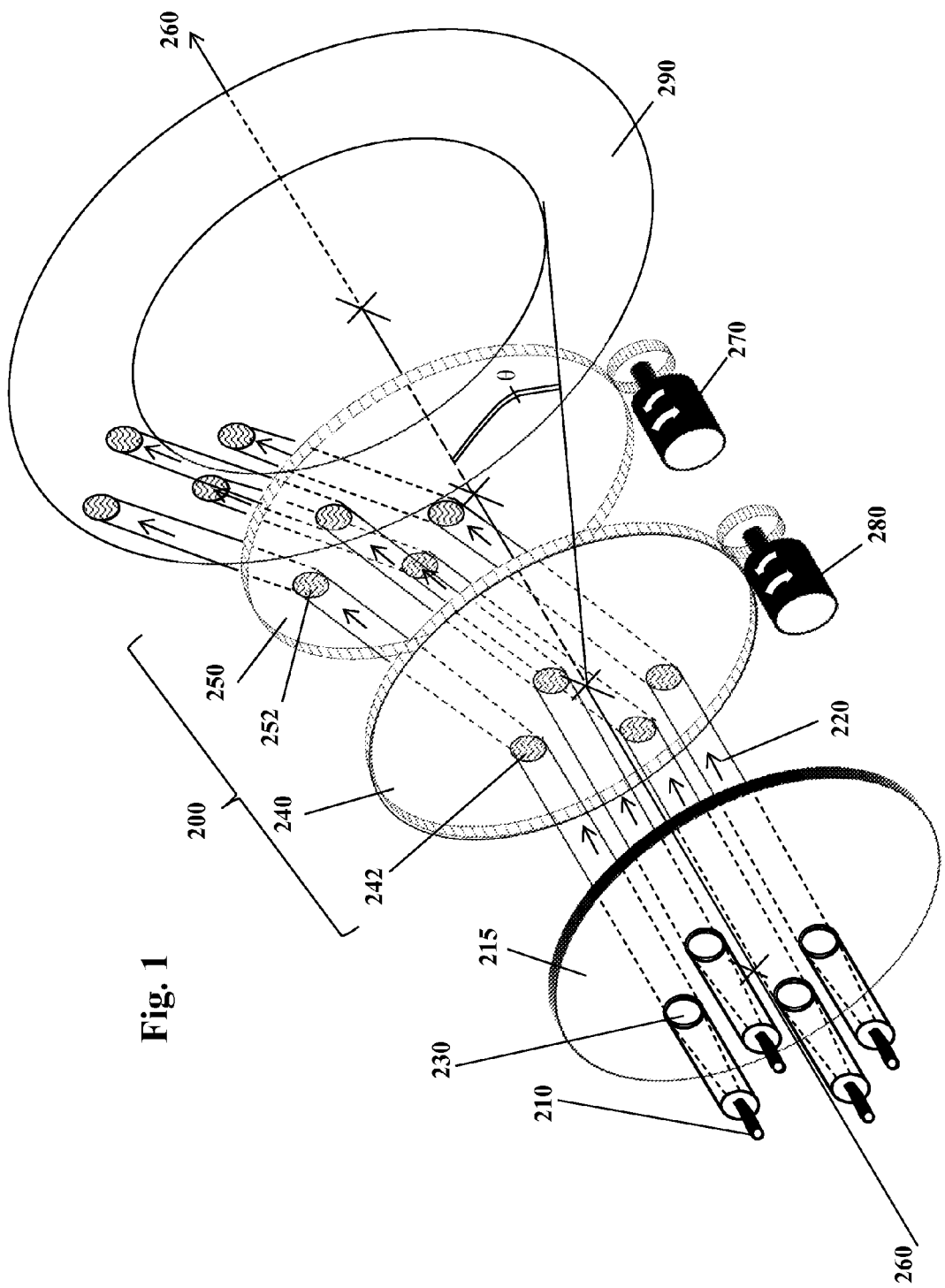
FIG. 1 illustrates the bidirectional beam director with multiple laser beams.

FIG. 1 illustrates a multi-beam laser control system coupled to a bidirectional beam director 200. Multiple collimated beams 220 emitted from multiple laser sources 210 are aimed at a target board 290. The multiple laser sources 210 (shown in FIG. 1 as fibers) are mounted on a planar board 215 and are collimated using collimating lenses 230. The bidirectional beam director 200 consists of a pair of optically coupled diffraction gratings 240, 250 each configured to rotate around a common axis 260. The actuation mechanism for this rotation is shown in the figure as two motors 280, 270 which are mechanically coupled to the two gratings 240, 250, respectively. Many other types of actuation mechanisms can be used. The figure illustrates two independent rotating mechanisms, however, depending on the requirements or constraints imposed on the steering angle, the steering mechanisms can be independent or mechanically or otherwise coupled.

The gratings 240, 250 are positioned substantially parallel to each other to achieve a compact arrangement. This parallel arrangement leads to a common axis 260 of rotation. Alternately, the gratings 240, 250 could be tilted with respect to each other to accommodate other arrangements and geometries. This would separate the axis of rotation of one grating from that of the other grating, i.e., they would no longer be common.

The beams 220 emitted from the laser sources 210 are incident on the first grating 240 at the spots marked with shaded circles 242. The beams 220 get deflected by the first grating 240 and are incident on the second grating 250 at the spots marked with shaded circles 252. The beams 220 are deflected again by the second grating 250. As a result of the two deflections, the beams 220 change direction by θ degrees. The beams can be steered within a cone as illustrated. The bidirectional beam director may further include a third diffraction grating (not shown) optically coupled to the second diffraction grating 250. The bidirectional beam director may further include a conformal window (not shown) coupled to the last grating in the optical train.

The multi-beam laser beam control system with the bidirectional beam director 200 may further contain elements that have been disclosed in U.S. patent publication No. 2011-0176565 or in U.S. patent application Ser. No. 13/476,380.

Figure 2:
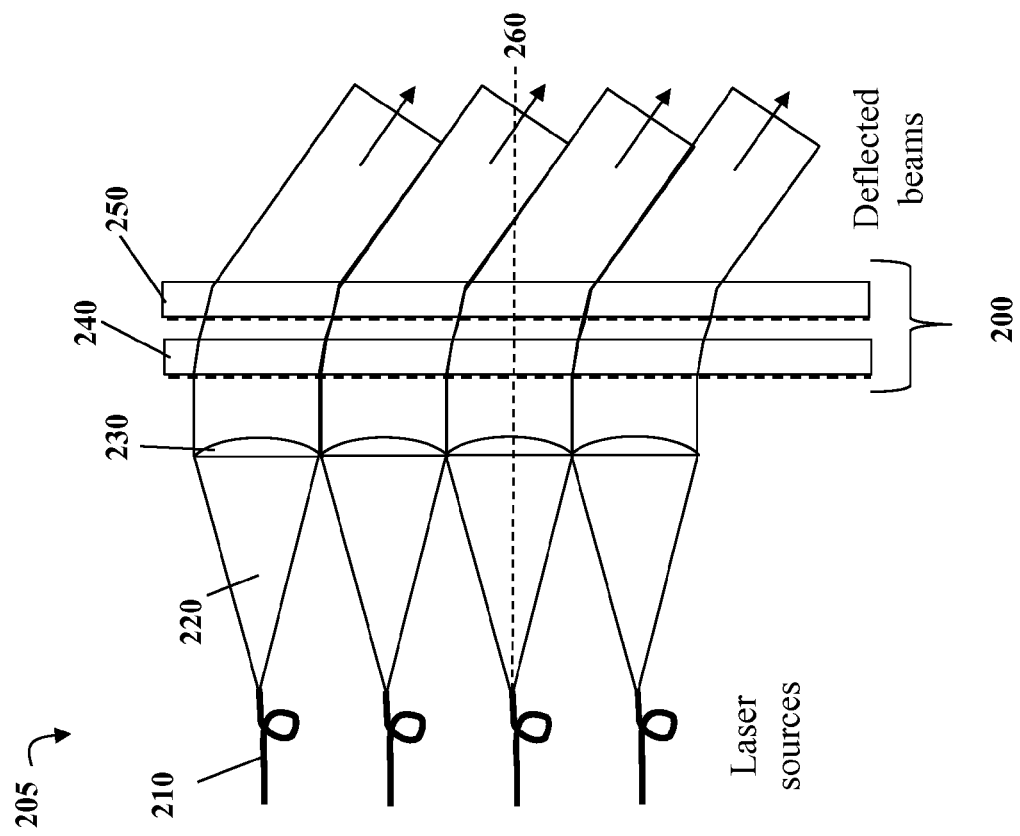
FIG. 2 illustrates the cross section of the bidirectional beam director illustrated in FIG. 1.

FIG. 2 shows the cross section 205 (side view) of the bidirectional beam director 200 with the four laser sources 210. The laser sources 210 (shown here as fibers) emit four beams 220. The beams are approximately collimated using lenses 230 so they have a nearly fixed angle of incidence on the first diffraction grating 240 which may have an anti-reflective (AR) coating. Nominal diffractive angle of the first grating 240 can be 20-30 degrees. Since the angles of incidence and existence are nearly constant as the first grating 240 rotates, all surfaces can be AR coated with extremely high efficiency for the narrow wavelength laser beams. The second grating 250 is another diffraction grating—usually of nearly equal diffraction angle as the first grating 240 so that the two grating deflections can sum close to zero when they have complementary rotation angles to cover the middle of the field of regard.

In the drawing, the patterned sides of the gratings 240, 250 are designated with dashed lines. Either the flat or the patterned side of the gratings 240, 250 may be pointed towards the laser sources 210. When the second grating 250 is parallel to the first grating 240 and when the first surface of the second grating 250 is flat (i.e., not patterned), then the angle of incidence on that surface is approximately independent of the rotation angle of the first grating 240. This allows that first surface to be AR coated with very high performance. Since the angles of incidence and existence on the second surface of grating 250 will vary with the grating rotation, broader angle anti-reflection coatings will be needed on the second surface of the second grating, usually implying slightly less transmission.

Both gratings 240, 250 are individually configured to rotate around their respective rotation axes (which may be a common axis 260, if the gratings are parallel) independent of each other. This rotation creates a hollow cone of ray deviation, and two hollow cones created by the two independently rotating gratings 240, 250 offer full coverage of the entire filled cone. The two gratings 240, 250 are typically set for equal deviation so that the combined deflection can be close to zero when they have complementary rotation angles. This zero sum allows the center of the cone to be accessed. Adding a third independently rotating grating can provide the extra degree of freedom needed to make certain that all points within the cone are accessible.

There are two types of losses that result from the geometry of the two gratings 240, 250. The first type is transmission loss. These occur when part of the light gets reflected into a wrong direction. The second type is fill factor loss. These occur when part of the light rays transmit with gaps between them. Both types are explained below.

Figure 3:
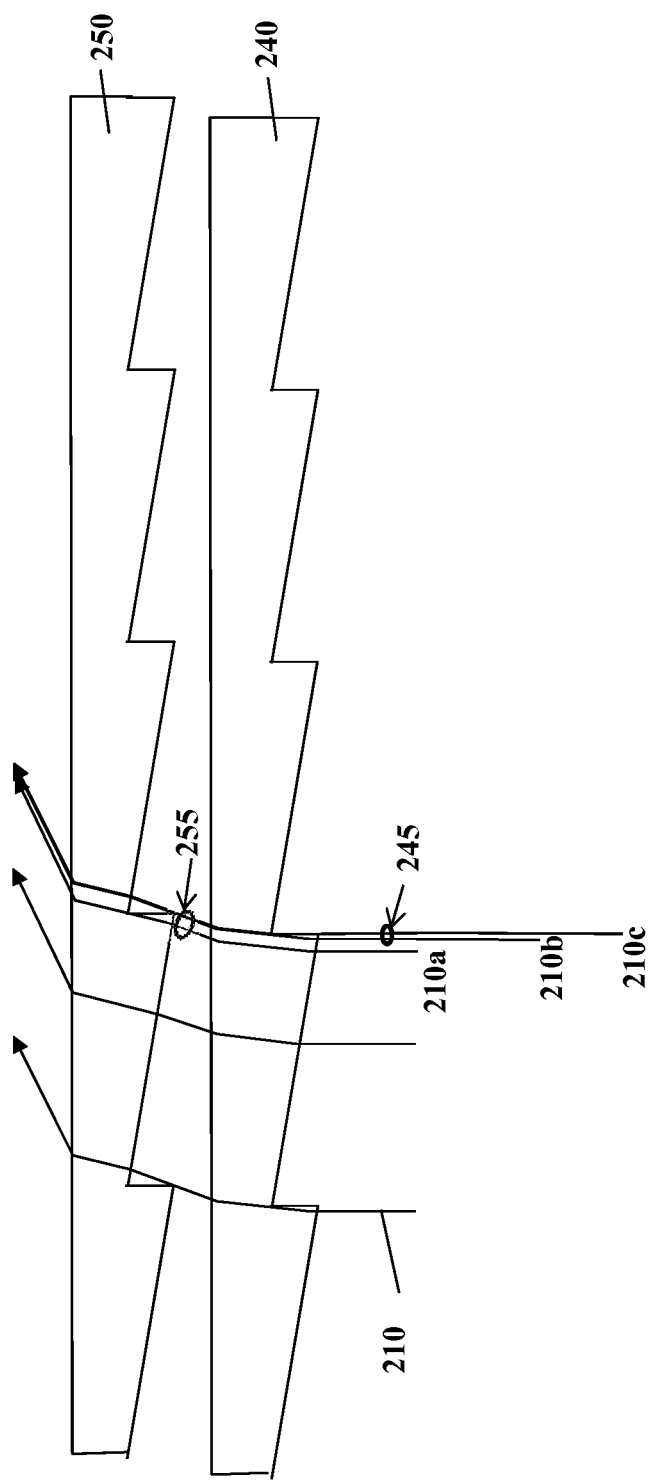
FIG. 3 illustrates transmission losses in the gratings.
Figure 4:
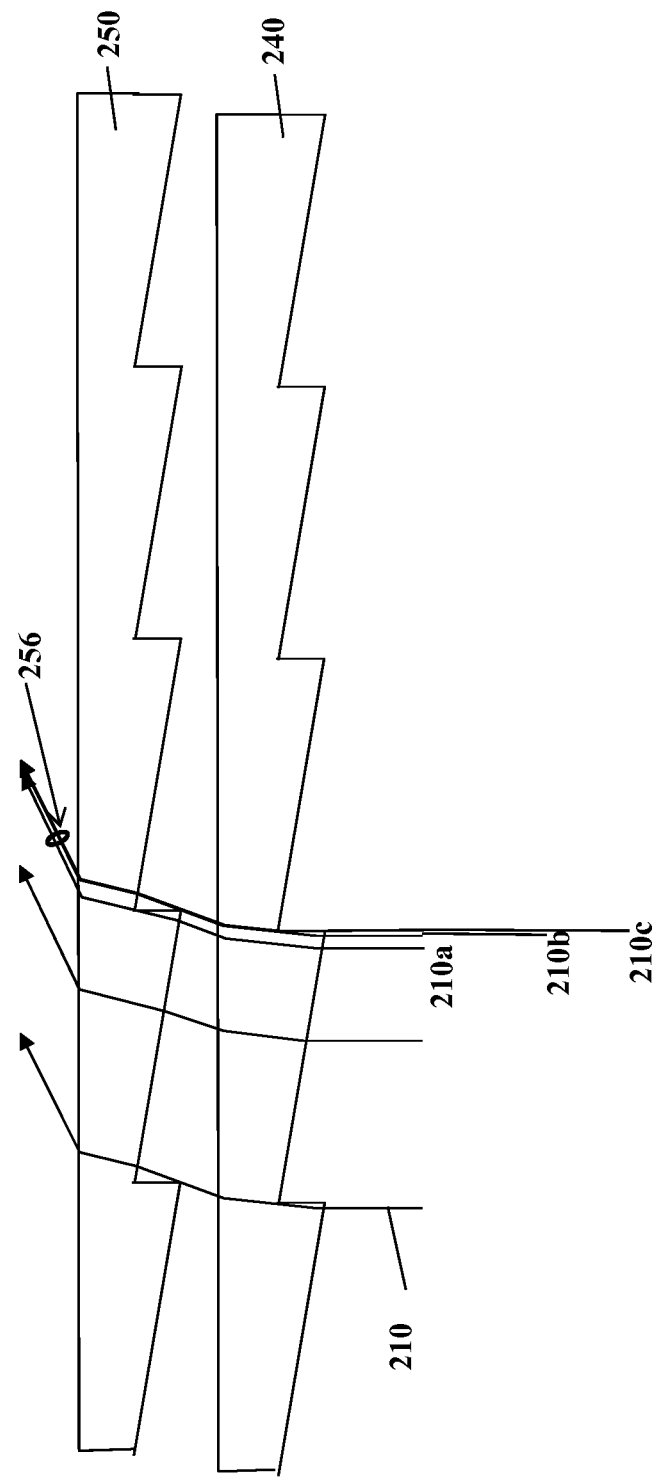
FIG. 4 illustrates fill factor losses in the gratings.

1) Transmission Loss: When the beams pass through the two gratings 240, 250, some of the light can be lost because the beams do not strike the correct surfaces. FIG. 3 illustrates how there is a small transmission loss in the first grating 240 shown by the lower ellipse 245 where light between the rays labeled 210b and 210c strike the vertical grating wall and reflect into a different direction. Similarly, the second grating also causes transmission loss as illustrated by the upper ellipse 255. The reflected light will appear about 40 degrees to the left of the main beam 210 in this example.
2) Fill factor Loss: As FIG. 4 shows, there is no fill factor loss in the first grating 240 since the beam and the blaze sides are both set to vertical. This cannot be achieved with the second grating 250 since the direction of incidence changes as the gratings 240, 250 rotate. However the second grating 250 can have a fill factor loss as shown by the gap 256 between exiting rays 210a, 210b.

To minimize the fill factor losses for the outgoing beam, the preferred configuration of the diffraction gratings is when the patterned or blazed sides of the two gratings face towards the laser sources 210. However, other arrangements can be appropriate depending on the application and its constraints.

The diffraction gratings 240, 250 can be manufactured using optical component manufacturing processes currently known in the art. One organization that is capable of making them is HORIBA Jobin Yvon, which has facilities in France, Japan and the USA.

Figure 5:
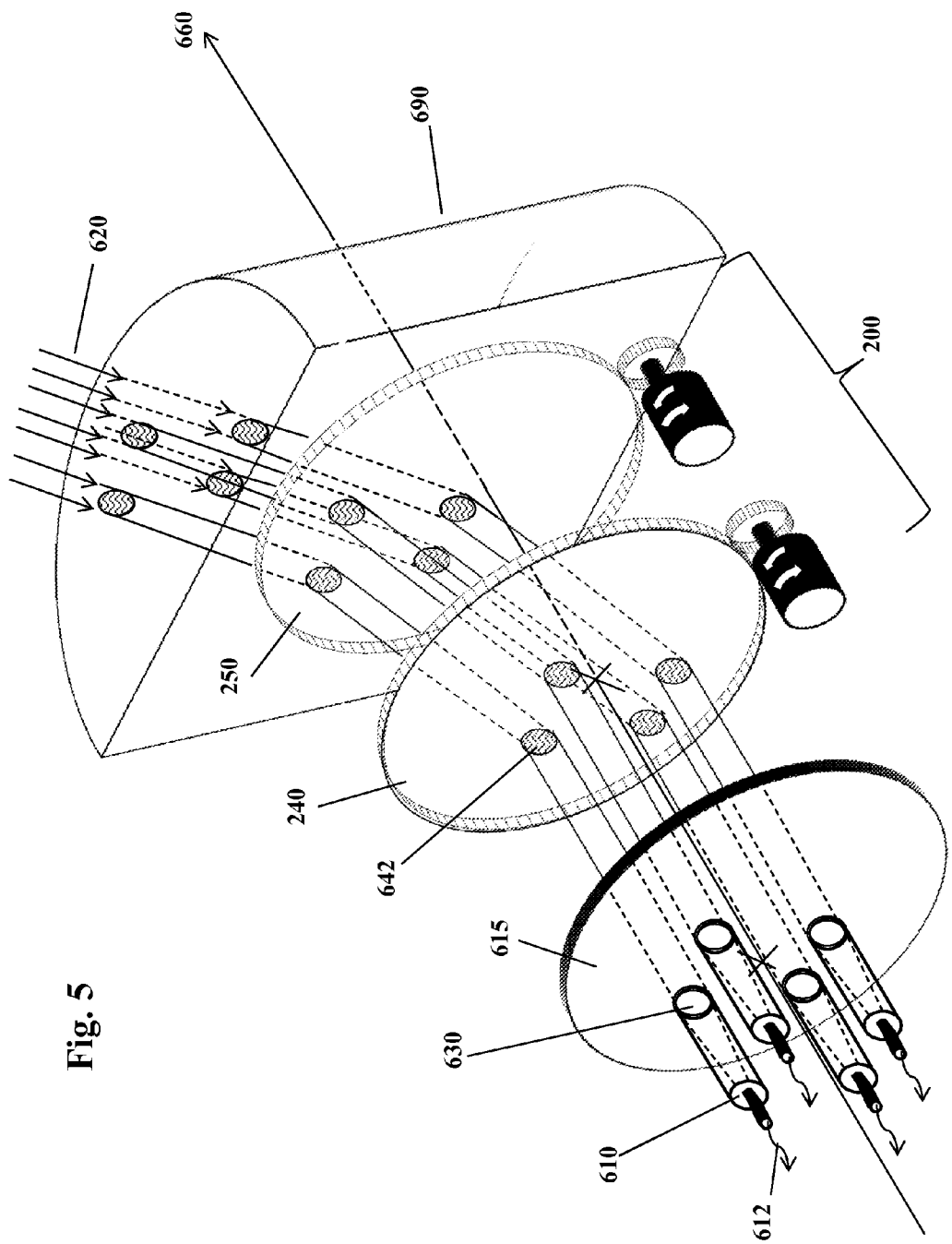
FIG. 5 illustrates the bidirectional beam director configured to steer light onto multiple detectors.

A multi aperture receiver array with a bidirectional beam director 200 is illustrated in FIG. 5. Incoming light beams 620 transmit through a conformal window 690 and pass through the diffraction gratings 250, 240 of the bidirectional beam director 200 which steer them towards apertures 630. The light is focused onto detectors 610. The detector outputs carry electrical signals 612 proportional to the intensity of the light incident upon the corresponding detector 610. The gratings 240, 250 are optically coupled and they rotate independently.

Figure 6B:
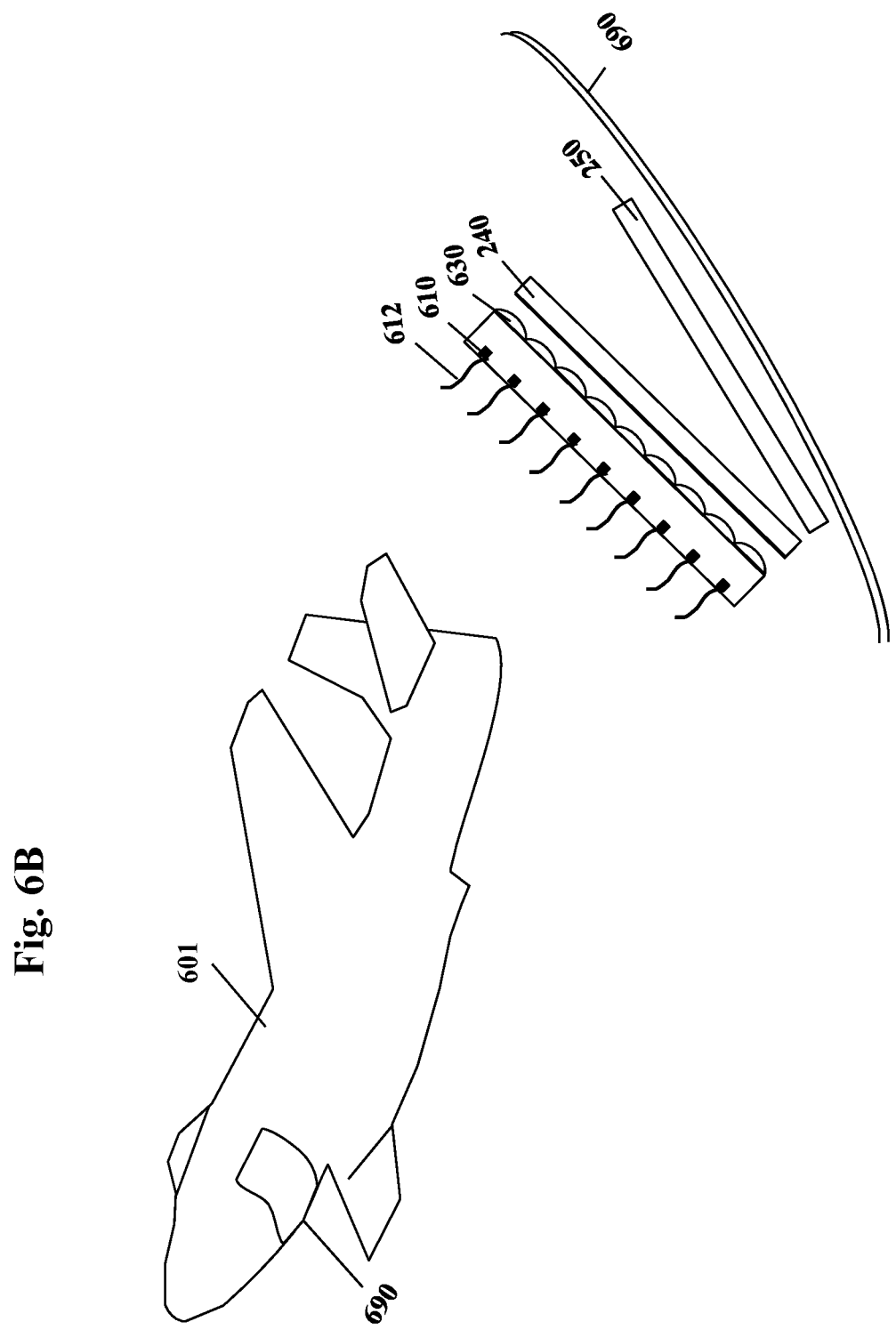
FIG. 6B illustrates the cross section of an alternate embodiment of the bidirectional beam director where the gratings are not parallel to each other, and mounting onto an aircraft.

In the drawing the gratings 240, 250 are substantially parallel and they are shown to rotate around a common axis 660; however, the grating may be arranged differently where each grating has a different axis of rotation. FIG. 6A shows the cross section (side view) of the optical elements of FIG. 5 and how they can be mounted conformally onto an aircraft 601. FIG. 6B shows the same arrangement with a tilted grating pair, i.e., where the gratings 240, 250 are not parallel.

The multi aperture receiver array may be part of a multi beam laser control system that has been disclosed in U.S. patent publication No. 2011-0176565 or in U.S. patent application Ser. No. 13/476,380.

Figure 7:
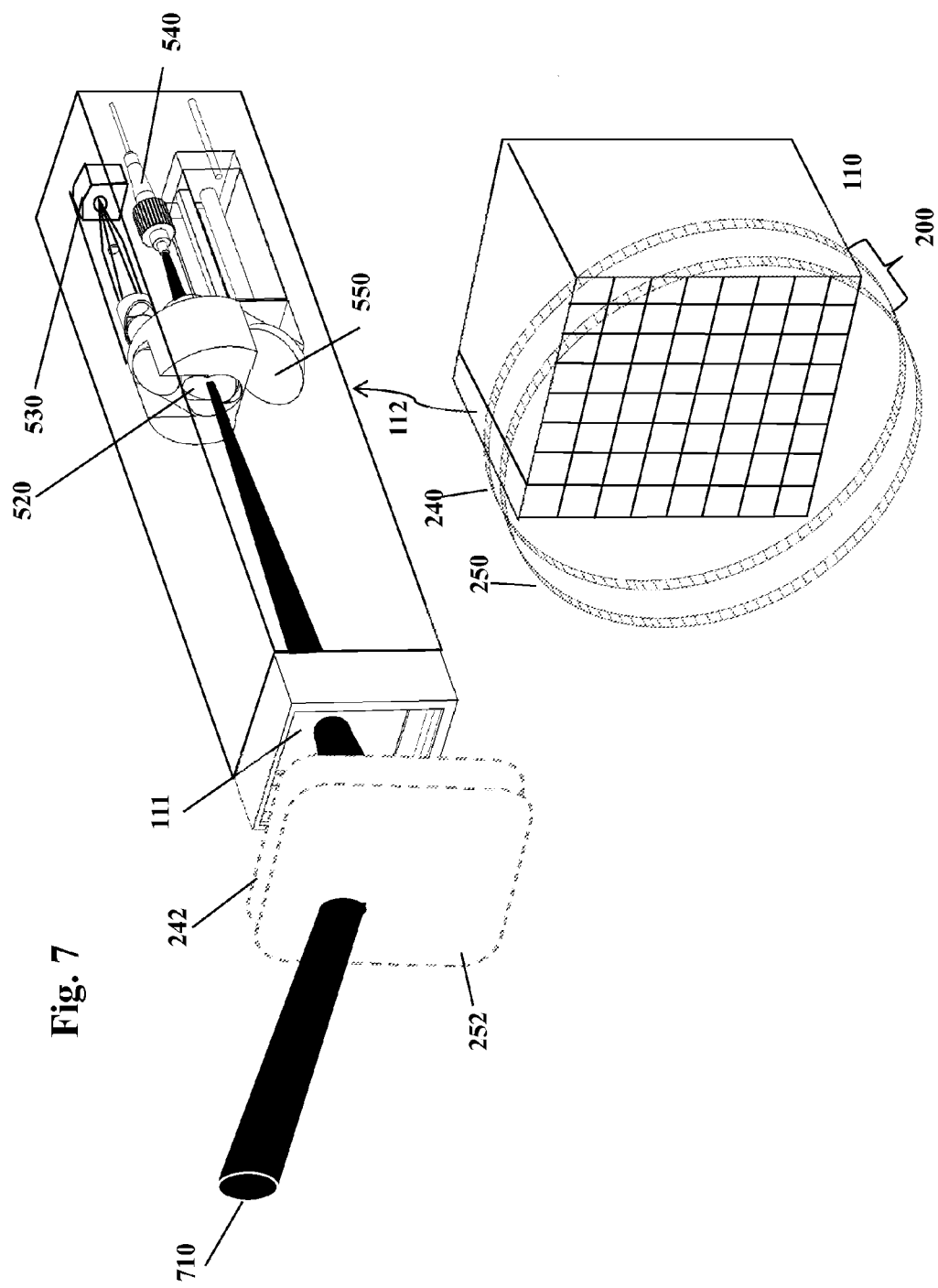
FIG. 7 illustrates a laser transmitter array coupled to the bidirectional beam director.

A multi-beam transmitter array 110 with a bidirectional beam director 200 is illustrated in FIG. 7. The transmitter array may be part of a multi beam laser control system that has been disclosed in U.S. patent application Ser. No. 13/476, 380. A single unit 112 of the transmitter array with sub-aperture 111 is shown in the top drawing. The aperture 111 may be formed by a quarter waveplate and collimating lens combination. The source 540 of one of the transmitter array laser beams emits its beam 710 towards a polarizing aperture sharing element 520. Part of the beam 710 is reflected from the aperture sharing element 520 towards a fast steering mirror 550 which then reflects it through the aperture sharing element 520 towards a tracking focal plane array or sensor 530. The data from the tracking focal plane allows laser beam 710 to be accurately pointed toward the target using a fast steering mirror 550. The output of the sensor 530 may be coupled to the fast steering mirror 550 either through a local processing loop or through the system processor. The gratings 240, 250 are optically coupled to the multiple apertures of the transmitter array and to each other. Each grating rotates independently around its own axis. The two gratings 240, 250 may further be positioned substantially parallel to each other so that their rotation axes are also substantially parallel or common to both gratings. The beam 710 is first incident on a region 242 the first grating 240 and gets deflected by the first grating 240. Second, the beam 710 is incident on a region 252 of the second grating 250 and gets deflected again by the second grating 250.

One advantage of using the bidirectional beam director with a multi-beam transmitter array is that both the outgoing and the incoming light beams are steered substantially identically in a compact manner. This is the case with a multi-beam transmitter array which contains laser sources that emit laser light as well detectors that receive laser light for tracking where the outgoing and incoming laser light beams both go through the same aperture. Such a multi-beam transmitter array was disclosed in the in U.S. patent publication No. 2011-0176565.

Figure 8A:
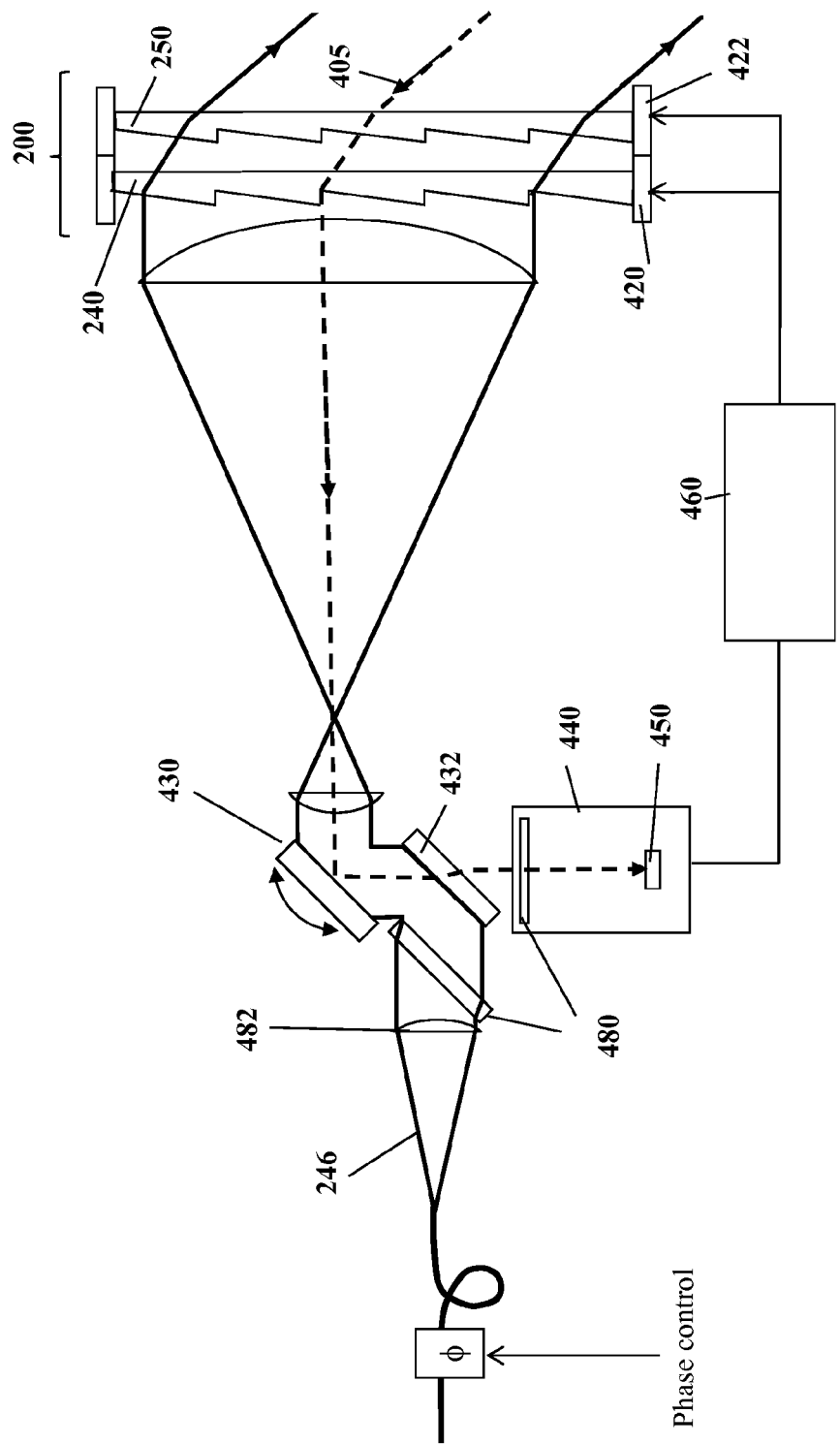
FIG. 8A illustrates a single element of a transmitter array coupled to a bidirectional beam director.

FIG. 8A illustrates a laser transmitter with a bidirectional beam director 200. The laser transmitter may be a stand-alone unit or be an element of a transmitter array as disclosed in the in U.S. patent publication No. 2011-0176565. The phase modulated beam 246 is directed through a series of lenses 482 and reflected off a polarizing beam splitter (PBS) 432. A fast steering mirror (FSM) 430 is included for fine steering control, and the bidirectional beam director grating pair 240, 250 positioned using two rotation elements 420, 422, is included for coarse steering control of the emitted beam 246. Steering is achieved with the aid of laser light 405 incident upon the outer grating 250, this laser light 405 being light return from the target. The grating pair 240, 250 are each rotated so that they collectively direct the incident laser light 405 along the optical axis of the transmit aperture where it is steered by the FSM 430 towards the PBS 432. The PBS 432 directs the incident laser light 405 to a tracker 440, which includes a position detector sensor 450. The output of the position detector sensor 450 provides a measurement of where the centroid of the incident laser light 405 is positioned with respect to the optical axis of the transmit aperture. The position detector sensor 450 output is sent to a controller 460 which adjusts the rotation elements 420, 422 so that the centroid of the incident laser light 405 coincides with the optical axis of the transmitter. Thus, the rotation elements 420, 422, the FSM 430, the tracker 440, and the controller 460 collectively implement the steering functions for the transmitter. Optionally, clean-up polarizers 480 can be placed in the optical path of the phase modulated beam 246 for polarization control.

While it may be advantageous to utilize the laser light return as a reference for steering the beams (as disclosed in U.S. patent publication No. 2011/0103410), another approach for controlling pointing direction is to flood the target with a track illuminator laser, which typically operates at a wavelength different from the wavelength or is modulated in intensity to distinguish its return from the HEL return of the main laser beam or beams. In this alternative approach, the return of the track illuminator laser can be used for directing the beams.

Regardless of which approach is used to establish a reference for steering the beams, the method for controlling beam pointing direction is to point each beam toward the centroid of the incoming laser light. The pointing direction can be further corrected with a potential point-ahead offset to compensate for the speed of light delay, e.g., to accommodate target or transmitter array motion. Sometimes, the presence of a highly reflective area on the target (such as a retroreflector) or a desired aimpoint away from the center of the target may require that the beams point with a specified offset from the centroid of the laser light return so that they will be incident on the desired aimpoint.

Figure 8B:
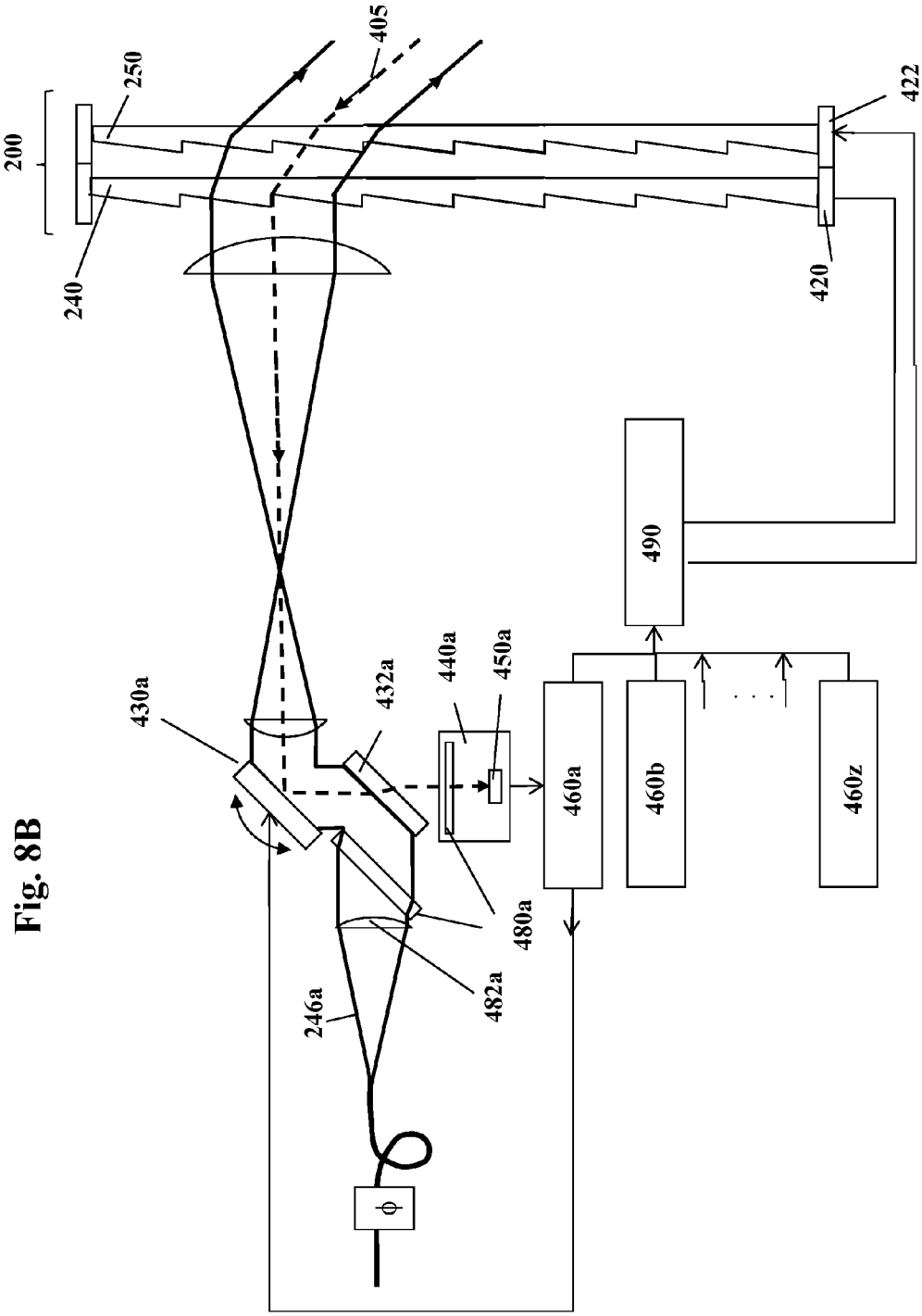
FIG. 8B illustrates a single element of a transmitter array coupled to a bidirectional beam director that is also coupled to other elements of the same transmitter array.

FIG. 8B illustrates the optical elements behind a single aperture of a transmitter array with a bidirectional beam director 200. These elements constitute one transmitter of a transmitter array as disclosed in the in U.S. patent publication No. 2011-0176565. A phase modulated beam 246a is directed through a series of lenses 482a and reflected off a polarizing beam splitter (PBS) 432a. A fast steering mirror (FSM) 430a is included for fine steering control, and the bidirectional beam director grating pair 240, 250 positioned using two rotation elements 420, 422, is included for coarse steering control of the emitted beam 246a. The beam director grating pair 240, 250 cover multiple transmitter apertures. Steering is achieved with the aid of laser light 405 incident upon the outer grating 250, this laser light 405 being light returned from the target. The grating pair 240, 250 directs the incident laser light 405 along the optical axis of the transmit aperture where it is steered by the FSM 430a towards the PBS 432a. The PBS 432a directs the incident laser light 405 to a tracker 440a, which includes a position detector sensor 450a. The output of the position detector sensor 450a provides a measurement of where the centroid of the incident laser light 405 is positioned with respect to the optical axis of the transmit aperture. The position detector sensor 450a output is sent to a controller 460a which adjusts the fast steering mirror 482a. The rotation elements 420, 422 are controlled by a separate controller 490 which receives data from multiple controllers 460a, 460b, and so on where each controller (460a, 460b, . . . 460z) is local to a single element of the transmitter array. In this way, the bidirectional beam director 200 is shared between multiple elements of the transmitter array.

FIG. 9 illustrates a reflecting telescope 850 with a bidirectional beam director 200. The telescope 850 both receives and transmits light. Incoming light 880 transmits through a conformal window 810 and passes through the diffraction gratings 250, 240 which steer them towards the remaining optics. Similarly outgoing light 870 passes through the diffraction gratings 240, 250 and out through the conformal window 810. The gratings 240, 250 are optically coupled and they may rotate independently or in a mechanically or otherwise coupled manner. This telescope can also be mounted conformally onto a platform that has a curved skin (e.g., an aircraft). The figure illustrates a Cassegrain telescope. A bidirectional beam director can also be coupled to many other types of reflecting telescopes, such as the Coude or the Newtonian variety.

Figure 10:
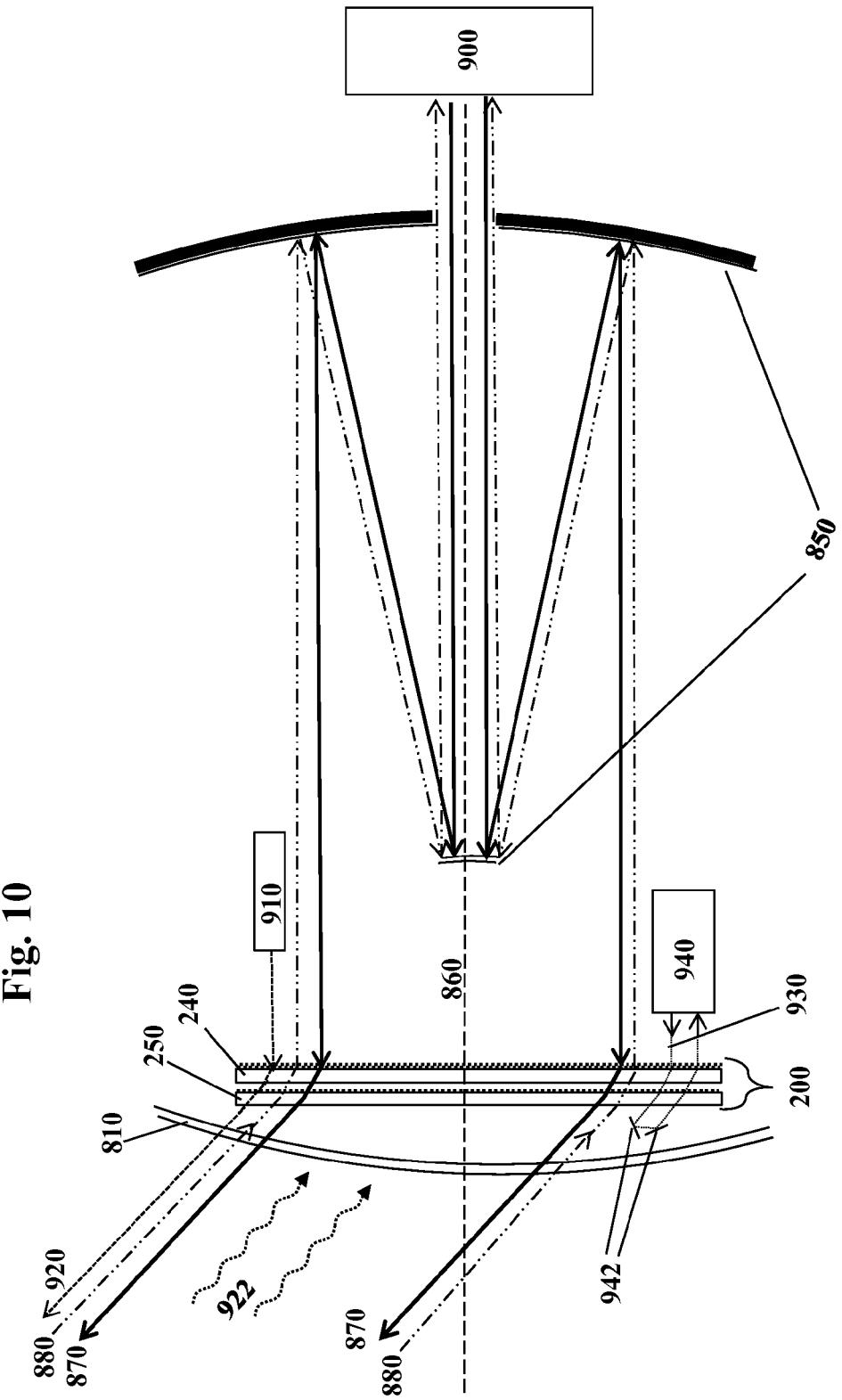
FIG. 10 illustrates the bidirectional beam director coupled to a laser beam control system.

FIG. 10 illustrates a high energy laser (HEL) system that has an output aperture configured both to transmit an outgoing HEL beam 870 directed toward a target and to receive a laser beam return 880, where the laser beam return 880 includes scatter from the outgoing laser beam. The bidirectional nature of the beam director 200 is essential for such an HEL system. The bidirectional aperture allows for two functions, namely the tracking and wavefront correction for the outgoing HEL beam 870 where the incoming light 880 is used for tracking and wavefront correction. The optical elements for tracking and wavefront correction (illustrated as a block 900 in FIG. 10) have been disclosed in the U.S. patent publication No. 2011/0103410. The disclosure also outlines how polarization can be used to isolate the laser beam return 880 from the outgoing HEL beam 870 by using an approximate quarter-wave layer after the bidirectional beam director 200. Such a quarter-wave layer could be a separate plate disposed between window 810 and grating 250 or between gratings 240, 250 or immediately after the grating 240 or a birefringent layer on the inside or outside of the conformal window 810. The result of such a quarter-wave layer is to reverse the polarization of most of the target backscatter in the laser return beam 880 under normal conditions. The backscattered HEL light prior to the quarter-wave plate can then be separated using a polarization beamsplitter from the light scattered from the target which passes through the quarter-wave plate going out and coming back. The result is the ability to discern the HEL target return in the presence of internal HEL scatter. Thus, the HEL light hitting the target will scatter back towards the bidirectional beam director 200 and can be separated out to use for wavefront sensor measurements of wavefront aberration. In addition, a separate target illuminator 910 may project an illuminating beam or floodlight beam 920 with sufficient divergence to illuminate a substantial region of the target, and the backscatter 922 from that floodlight beam 920 will also reverse polarization and can be separated out from the internal HEL backscatter. The return 922 from the floodlight beam 920 can therefore be used to image a larger region on the target suitable for aimpoint selection and maintenance. Typically, the floodlight return beam 922 will have much less power than the main HEL beam 870 and thus will have substantially weaker backscatter. Unless special care is taken, the floodlight return 922 can be lost in the hit spot return. To avoid this there are three possible approaches, which are separate wavelengths, intensity modulation and phase modulation.

First, one can set the wavelength of the floodlight beam 920 slightly different from the HEL beam 870 wavelength. This will allow a dichroic filter to separate out the returns to produce both an image of the hit spot and an image of the floodlit target. If the sensors for each wavelength are set up to be in precise registration with each other (for example as shown in the U.S. patent publication No. 2011/0103410), then these two images will be suitable for aimpoint selection and maintenance. At the same time, some of the return light from the hit spot light can be used as input into a wavefront sensor to measure the wavefront distortion to be corrected by a deformable mirror.

This first approach requires a second laser source very close to the HEL wavelength but enough apart in wavelength so that the HEL back scatter can be separated out. Since the bidirectional beam director 200 steers the light at an angle proportional to the wavelength, these two wavelength returns will not be parallel except at the zero deflection point of the beam director. They will have an angular offset proportional to the fractional change in wavelength between them times the deflection angle of the beam director. Thus, a 50 degree deflection with a 0.1% wavelength shift would produce an angular offset between the hit spot and flood returns of about 0.1%*50 degrees=873 microradians. Since the pointing must typically be known to better than 0.5 microradians, it is recommended that either the grating rotation angles are accurately known (e.g., using optical encoders) or a local sensor 940 measuring the deflection at these two wavelengths be used. Such a sensor 940 would inject the two beams at the two wavelengths in precise registration and measure the difference in refraction very accurately through an unused portion of the grating pair 240, 250. This type of two source angular measurement is similar to a star tracker, and there are many simple and accurate ways to make this sensor 940 as long as the source direction is adjusted to approximately compensate for beam director deflection. Even a simple lens to a focal plane will give the accuracy required to measure the differential angle between the two beams at the two different wavelengths.

The second approach is to have the floodlight beam 920 coherent with the HEL beam 870 (i.e., at the same wavelength) but modulated in phase at some fast rate such as 1 MHz where, for instance, the phase of the floodlight beam 920 is shifted by one quarter wave every 1 microsecond to give one cycle of interference every 4 microseconds. Since the frequency of the illuminator beam 920 and the HEL beam 870 are the same to 1 part per billion in this case, the bidirectional beam director will deflect the HEL beam 870 and the target floodlight beam 920 equally to about 1 nanoradian or less. This will produce an interference of 250 KHz between the flood return 922 and the hit spot return 880. The AC rate is chosen sufficiently fast to keep the flood and hit spot speckle patterns fairly constant during the measurement period.

This AC interference is essentially an AC hologram of the flood return 922 interfering with the hit spot return 880. Due to coherent interference, there will almost always be modulation of measurable quantity. Even when the flood return 922 is a thousand times weaker than the hit spot return 880, the modulation is still 6.3% on average which allows excellent phase and amplitude measurements to be made since the intensity of the return is from the full HEL. This AC hologram from the target can then be directed to a fast focal plane array which is imaged conjugate to the entrance aperture of the HEL system. If the hit spot is of satisfactory quality, then the hit spot wavefront back at the aperture will be close to a perfect spherical wave and will be an adequate reference for the flood return hologram (which will have the same average curvature since it is from the same target range). The phase and amplitude of this interference can be used to create a complex number for each pixel in the aperture which will measure the flood return speckle pattern relative to the hit spot reference return. The Fourier transform of this two dimensional data array will produce a coherent image of the flood lit target with the hit spot at the center. This image will typically have the same resolution as the hit spot used as the reference.

The third approach is to modulate the intensity of the flood light at the same laser wavelength—such as turning the floodlight on and off rapidly or pulsing it. Then a single fast position sensitive detector can determine the centroid of the hit spot return when the flood return is off and the centroid of both returns when the flood return is on. By noting the change in total energy between flood on and flood off conditions, the difference in centroid between the flood beam return and the hit spot return can be estimated. Controlling this centroid difference will control the position of the hit spot on the target for aimpoint selection and maintenance.

The above discussion has outlined a process by which polarization and/or wavelength and/or intensity modulation are used to isolate the target return from the local HEL scatter inside the optical system 900. Furthermore, it has shown that all the functions required for normal HEL operation can be achieved using the bidirectional beam director 200. The benefits are substantial savings in size and weight and enhanced aerodynamic performance of the carrying platform (e.g., aircraft) making it possible to use the HEL during supersonic flight.

This discussion of using the bidirectional beam director for HEL projection combined with HEL hit spot tracking applies equally well to phased array HEL systems and multi-beam laser control systems such as those disclosed in U.S. patent publication No. 2011-0176565 and U.S. patent application Ser. No. 13/476,380.

The bidirectional beam director can also be used to direct the field of view for any sensor array which is used to detect a laser return. Examples include two dimensional sensor arrays for conformal imaging and for the multi-beam laser phasing and aimpoint control systems disclosed in U.S. patent publication No. 2011-0176565 and U.S. patent application Ser. No. 13/476,380.

Thus, a bidirectional beam director is disclosed. While embodiments of the invention has been shown and described, it will be apparent to those skilled in the art that many more modifications are possible without departing from the inventive concepts herein. The invention, therefore, is not to be restricted except in the spirit of the following claims.

What is claimed is:

1. A laser beam control system comprising:
   an output aperture through which an outgoing laser beam is directed toward a target and through which a laser beam return is received, the laser beam return including scatter from the outgoing laser beam; and
   a bidirectional beam director optically coupled to the output aperture and configured to steer the outgoing laser beam toward the target, the bidirectional beam director comprising a first diffraction grating, a second diffraction grating optically coupled to the first diffraction grating, and a third diffraction grating optically coupled to the second diffraction grating, each diffraction grating being independently rotatable, wherein rotation of any one or more of the diffraction gratings alters a transmit direction of the outgoing laser beam and a receive direction of the laser beam return.

2. The laser beam control system of claim 1, wherein the first diffraction grating and the second diffraction grating are substantially parallel to each other.

3. The laser beam control system of claim 1, wherein the rotation axis of first diffraction grating and the rotation axis of the second diffraction grating are substantially parallel to each other.

4. The laser beam control system of claim 1, further comprising a window optically coupled to the bidirectional beam director.

5. The laser beam control system of claim 4, wherein the window is curved and mounted conformal to the skin of a platform housing, the laser beam control system.

6. The laser beam control system of claim 4, wherein the window is constructed from spinel.

7. The laser beam control system of claim 1, further comprising a target illuminator laser configured to project an illuminating beam configured to illuminate a substantial region of the target.

8. The laser beam control system of claim 7, wherein the target illuminator laser is configured to project the illuminating beam toward the target through the output aperture.

9. The laser beam control system of claim 8, further comprising a sensor configured to measure the deflection of a laser beam through the bidirectional beam director.

10. The laser beam control system of claim 7, wherein target backscatter caused by the illuminating beam is received through the output aperture.

11. The laser beam control system of claim 7, wherein the wavelength of the illuminating beam is substantially the same as the wavelength of the outgoing laser beam.

12. The laser beam control system of claim 11, wherein the illuminating beam is modulated in phase.

13. The laser beam control system of claim 11, wherein the illuminating beam is modulated in intensity.

14. A laser beam control system comprising:
   an output aperture through which an outgoing laser beam is directed toward a target and through which a laser beam return is received the laser beam return including scatter from the outgoing laser beam; and
   a bidirectional beam director optically coupled to the output aperture and configured to steer the outgoing laser beam toward the target, the bidirectional beam director comprising, a first diffraction grating and a second diffraction crating optically coupled to the first diffraction grating, both diffraction gratings being independently rotatable, wherein rotation of one or both diffraction gratings alters a transmit direction of the outgoing laser beam and a receive direction of the laser beam return;
   a deformable mirror configured to control the outgoing laser beam; and
   a sensor configured to detect a wavefront of the laser beam return.

15. The laser beam control system of claim 14, further comprising an optics controller operationally coupled to the deformable mirror and configured o adjust the deformable mirror in response to the wavefront.

16. The laser beam control system of claim 14, wherein the bidirectional beam director is further configured to steer the laser beam return toward the sensor.

17. The laser beam control system of claim 16, further comprising a controller coupled to the bidirectional beam director, wherein the controller is configured to adjust a rotation angle of at least one of the diffraction gratings.

18. The laser beam control system of claim 17, wherein the rotation angle is determined based on an angle of incidence of the laser beam return on the output aperture.

19. A laser beam control system comprising:
   an output aperture through which an outgoing laser beam is directed toward a target and through Which a laser beam return is received, the laser beam return including scatter from the outgoing laser beam;
   a deformable mirror configured to control the outgoing laser beam;
   a sensor configured to detect a wavefront of the laser beam return;

a bidirectional beam director optically coupled to the output aperture and configured to steer the outgoing laser beam toward the target and to steer the laser beam return toward the sensor, the bidirectional beam director comprising a first diffraction grating and a second diffraction grating optically coupled to the first diffraction grating, both diffraction gratings being, independently rotatable, wherein rotation of one or both diffraction gratings alters a transmit direction of the outgoing laser beam and a receive direction of the laser beam return; and an optics controller operationally coupled to the deformable mirror and configured to adjust the deformable mirror in response to the detected wavefront.

20. The laser beam control system of claim 19, further comprising a controller coupled to the bidirectional beam director, wherein the controller is configured to adjust a rotation angle of at least one of the diffraction gratings.

21. The laser beam control system of claim 20, wherein the rotation angle is determined based on an angle of incidence of the laser beam return on the output aperture.

22. A multi-beam laser beam control system comprising:
a laser transmitter configured to emit light in a plurality of beams;
a bidirectional beam director configured to steer at least two of the beams emitted from the laser transmitter; the bidirectional beam director comprising a first diffraction grating and a second diffraction grating optically coupled to the first diffraction grating, both diffraction gratings being independently rotatable, wherein rotation of one or both diffraction gratings alters a transmit direction of the outgoing laser beams;
a sensor configured to receive light from the beams;
a processor communicably coupled to the sensor and configured to compute a relative phase of a wavefront of at least one of the beams based on output from the sensor; and
a controller communicably coupled to the processor and to the laser transmitter and configured to adjust a phase of at least one of the beams.

23. The multi-beam laser beam control system of claim 22, further comprising a controller coupled to the bidirectional beam director, wherein the controller is configured to adjust a rotation angle of at least one of the diffraction gratings.

24. The multi-beam laser beam control system of claim 23, wherein the rotation angle is determined based on an angle of incidence of the laser beam return.

25. A multi-beam laser beam control system comprising:
a laser transmitter configured to emit light in a plurality of beams;
a sensor optically coupled to the laser transmitter to receive light from the beams;
a first bidirectional beam director optically coupled to the laser transmitter, the first bidirectional beam director comprising a first diffraction grating and a second diffraction grating optically coupled to the first diffraction grating, both diffraction gratings being independently rotatable;
a second bidirectional beam director optically coupled to the sensor, the second bidirectional beam director comprising a third diffraction grating and a fourth diffraction grating optically coupled to the third diffraction grating, both diffraction gratings being independently rotatable;
a processor communicably coupled to the sensor and configured to compute a relative phase of a wavefront of at least one of the beams based on output from the sensor; and a controller communicably coupled to the processor and to the laser transmitter and configured to adjust a phase of at least one of the beams.

26. The multi-beam laser beam control system of claim 25, further comprising a first controller coupled to the first bidirectional beam director and a second controller coupled to the second bidirectional beam director, wherein both controllers are configured to adjust a steering angle of the respective bidirectional beam director to which each is coupled.

27. A method of controlling a laser beam, the method comprising:
directing the laser beam through an output aperture toward a target using a bidirectional beam director, the bidirectional beam director comprising a first diffraction grating and a second diffraction grating optically coupled to the first diffraction grating, both diffraction gratings being independently rotatable, rotation of one or both diffraction gratings alters a transmit direction of the outgoing laser beam;
detecting a laser beam return received through the same output aperture and through the same bidirectional beam director, wherein the laser beam return includes scatter from the laser beam, wherein the scatter results from the laser beam passing through a medium between the output aperture and the target, and wherein relative positions on a sensor of the laser beam return and a target illuminator beam return, which results from scatter of a target illuminator beam off the target, are detected; and
adjusting a rotation angle of bidirectional beam director in response to the detected laser beam return.

28. The method of claim 27, wherein adjusting the rotation angle of the bidirectional beam director includes adjusting the rotation angle of at least one diffraction grating in response to the detected relative positions on the sensor.

29. A method of controlling a laser beam, the method comprising:
directing the laser beam through an output aperture toward a target using a bidirectional beam director, the bidirectional beam director comprising a first diffraction grating and a second diffraction grating optically coupled to the first diffraction grating, both diffraction gratings being independently rotatable, rotation of one or both diffraction gratings alters a transmit direction of the outgoing laser beam;
detecting a laser beam return received through the same output aperture and through the same bidirectional beam director wherein the laser beam return includes scatter from the laser beam;
adjusting a rotation angle of bidirectional beam director in response to the detected laser beam return;
illuminating the target with a target illuminator beam at substantially the same wavelength as the laser beam;
modulating a phase of the target illuminator beam such that the laser beam return and target backscatter caused by the illuminating beam interfere at the output aperture; and
measuring a speckle pattern of the target illuminator beam return relative to the laser beam return.

30. The method of claim 29, wherein measuring the speckle pattern of the target illuminator beam return relative to the laser beam return comprises creating a two dimensional array of complex numbers, each complex element of the array representing a phase and an amplitude of interference between the target illuminator beam and the target backscatter and Fourier transforming the complex number array.

31. A method of controlling a laser beam, the method comprising:

directing the laser beam through an output aperture toward a target using a bidirectional beam director, the bidirectional beam director comprising a first diffraction grating and a second diffraction grating optically coupled to the first diffraction grating, both diffraction gratings being independently rotatable, rotation of one or both diffraction gratings alters a transmit direction of the outgoing laser beam;

detecting a laser beam return received through the same output aperture and through the same bidirectional beam director, wherein the laser beam return includes scatter from the laser beam;

adjusting a rotation angle of bidirectional beam director in response to the detected laser beam return;

illuminating the target with a target illuminator beam at substantially the same wavelength as the laser beam;

modulating an intensity of the target illuminator beam and detecting a change in the centroid of the laser beam return.

32. The method of claim 31, further comprising measuring the change in the centroid of the laser beam and adjusting the rotation angle of at least one diffraction grating based at least in part on the measured change.

33. A method of controlling a laser beam, the method comprising:

directing the laser beam through an output aperture toward a target using a bidirectional beam director, the bidirectional beam director comprising a first diffraction grating and a second diffraction grating optically coupled to the first diffraction grating, both diffraction gratings being independently rotatable, rotation of one or both diffraction gratings alters a transmit direction of the outgoing laser beam;

detecting a laser beam return received through the same output aperture and through the same bidirectional beam director, the laser beam return including scatter from the laser beam, and differentiating between a first scatter resulting from the laser beam incident upon the target and a second scatter resulting from the laser beam passing through a medium between the output aperture and the target; and adjusting a rotation angle of bidirectional beam director in response to the detected laser beam return.

34. The method of claim 33, wherein differentiating between the first scatter and the second scatter includes analyzing a signal generated by the scatter using speckle statistics.

35. The method of claim 33, further comprising measuring an angular bias present in the second scatter.

36. The method of claim 35, wherein measuring the angular bias includes comparing a first signal part generated by the first scatter with a second signal part generated by the second scatter.

37. The method of claim 35, wherein adjusting the rotation angle of at least one diffraction grating includes adjusting the rotation angle of at least one diffraction grating in response to the measured angular bias.

* * * * *